Dec. 17, 1946.  H. H. PLATT ET AL  2,412,908
ROTOR BLADE
Filed May 13, 1942  2 Sheets-Sheet 1
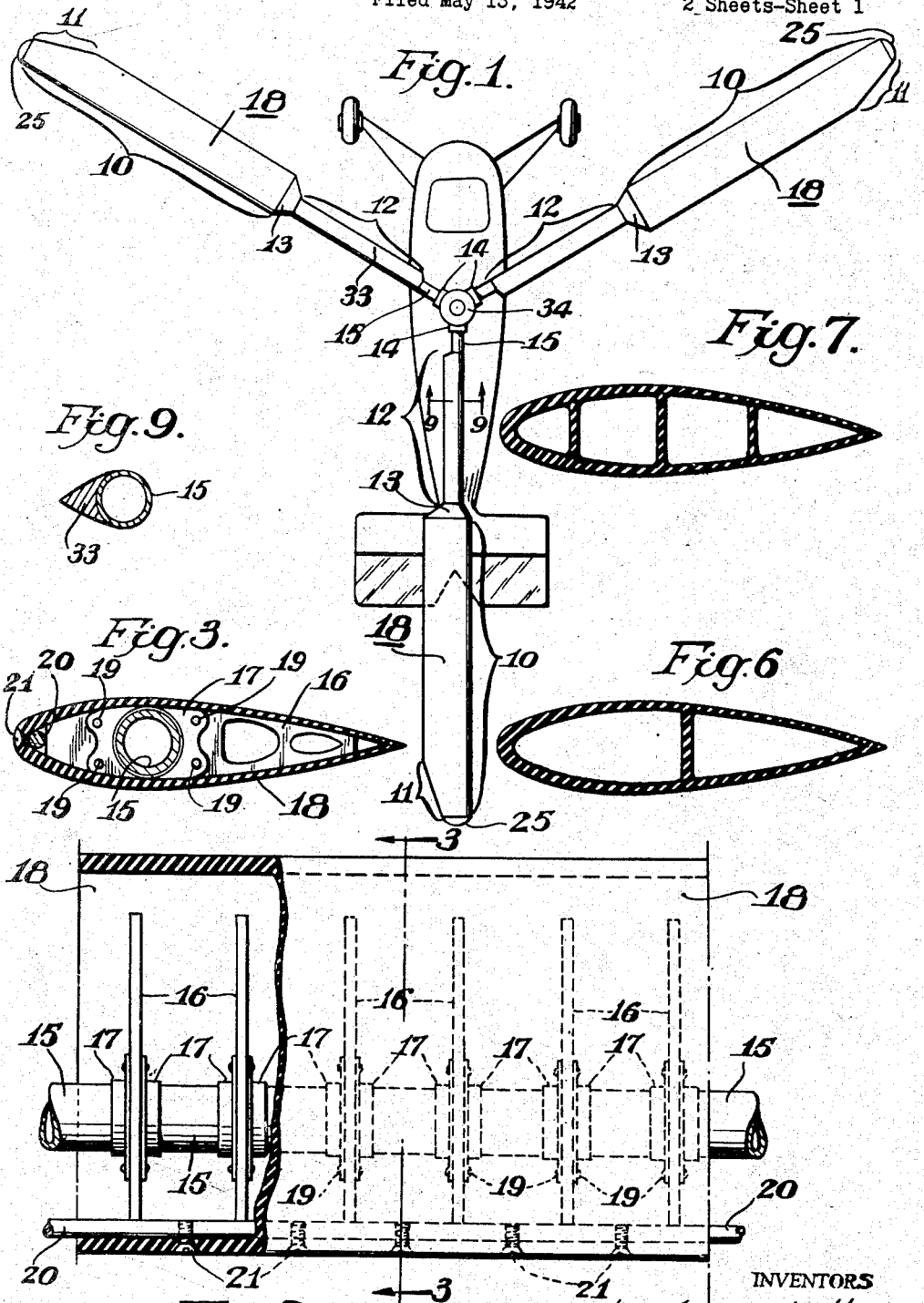
INVENTORS
Haviland H. Platt
Wynn Laurence Le Page
BY Leonard L. Kalish
their Attorney Dec. 17, 1946. H. H. PLATT ET AL 2,412,908
ROTOR BLADE
Filed May 13, 1942 2 Sheets-Sheet 2

INVENTORS
Haviland H. Platt
Wynn Laurence LePage
BY Leonard L. Kalish
their Attorney Patented Dec. 17, 1946

2,412,908

UNITED STATES PATENT OFFICE 2,412,908

ROTOR BLADE

Haviland H. Platt, New York, N. Y., and Wynn Laurence Le Page, Ardmore, Pa., assignors to Rotary Research Corporation, Eddystone, Pa., a corporation of Pennsylvania Application May 13, 1942, Serial No. 442,765

3 Claims. (Cl. 170—159)

Our invention relates to airfoil blades for use in aircraft lifting rotors and more particularly in aircraft deriving their main support from rotors which are actuated either by direct power drive or by the action of relative airflow over them, otherwise designated generically as rotating-wing aircraft, and in which the blades are attached to the rotor hub by pivots permitting universal swinging of the blades.

It is well known that rotor blades present difficult and exacting problems in design, construction and durability. Thus, correct performance requires accurate and enduring location of the chordwise centers of pressure and of gravity. To this end, the airfoil section must be maintained to a high degree of conformance with the basic airfoil section and the structural design must be capable of accurate weight control.

The blade must be capable of withstanding the very high centrifugal forces developed during the rotation and the outer surface must be capable of withstanding the large and fluctuating aerodynamic pressures developed by the high velocity of rotation.

Furthermore, to prevent objectionable torsion and flutter, the blade must be supported approximately in the center of pressure line and the chordwise location of the center of gravity of each element of length of the lifting portion must be close to the center of pressure line as well. To this end, it is customary to include some form of counterweight, usually non-structural, near the leading edge of the blade due to the fact that the center of pressure of a suitable airfoil is much nearer the leading than the trailing edge.

Above all, the above requirements must be achieved while maintaining the total weight of the blade within the very narrow limits prescribed, on the one hand by the general requirement for lightness in aircraft, and on the other hand by the maintenance of a suitable angle of equilibrium relative to the rotor axis while in flight.

The type of construction which has hitherto been found most suitable for approaching these requirements is one wherein a tubular steel spar is used as the main structural element. To this spar, wood ribs are attached, at spaced intervals, by suitable means such as flanged collars welded or pinned to the spar, the said ribs being formed generally to the airfoil section desired. A formed wood strip is applied at the trailing edge, while the leading ends of the ribs support a counterweight rod of metal and a leading edge reinforcing covering of thin plywood. The assembly is held together by glue and nails and an outer covering of fabric is applied over the whole and shrunk on by the application of a number of coats of "dope." This type of construction has been found in practice to have serious shortcomings, namely: the fabric covering does not maintain an accurate airfoil reaction; the fabric and plywood coverings are so delicate that damage to them in handling is of frequent occurrence; the covering finish is not adequately resistant to abrasion and is habitually impaired by the action of rain drops, hail stones or small solid objects picked up by the wind; the blade can be made only by hand fabrication methods which make it necessarily expensive in quantity production.

One object of our present invention is to provide a rotor blade capable of quantity production at low cost.

Another object is to provide a blade of rigidly accurate contour throughout its working length.

Still another object is to provide a rotor blade having a rugged and abrasion-resistant outer surface.

With these and other objects in view, as will appear more fully from the following detailed description, appended claims and accompanying drawings, our invention contemplates the use of a tubular spar for its main structural member; the prefabrication of a seamless envelope molded, or otherwise fabricated, of light, strong, resilient material, such as reinforced plastic, to a contour having an exterior airfoil cross-section; the insertion of the tubular spar through the hollow interior of the prefabricated envelope; and the attachment of the envelope to the tubular spar by suitable means such as collars and ribs, or lugs, welded, pinned or bolted to the spar and screwed to the envelope.

Our invention further contemplates the forming of the envelope with a thicker wall in the leading portion than in the trailing portion for the purposes of better weight and strength distribution.

Our invention also contemplates the use of an envelope formed with one or more longitudinal bulkheads to provide local stiffness without the use of ribs. In this form, the envelope is attached directly to lugs secured to the spar.

Our invention also includes other novel features of construction which will appear more fully from the following detailed description.

For purposes of illustrating our invention, we have shown in the accompanying drawings forms thereof which are at present preferred by us, since the same have been found to give satisfactory and reliable results, although it is to be understood that our invention is not limited to the precise arrangement of the instrumentalities as herein shown and described.

Referring to the drawings in which like reference characters indicate like parts:

Figure 1 represents a plan view of an aircraft having rotor blades embodying our invention.

Figure 2 represents a fragmentary, top elevational view of one of the rotor blades shown in Figure 1, drawn to a somewhat enlarged scale, parts being broken away better to reveal the construction thereof.

Figures 6 and 7 represent cross-sectional views similar to that of Figure 5 but showing alternative forms of blade envelope with different web arrangements from that of Figure 5.

Figure 8 represents a top elevational view of the tip portion of the rotor blade shown in Figures 1 and 2, parts being broken away better to reveal the construction thereof.

Figure 9 represents a cross-sectional view, on an enlarged scale, along the line 9—9 of Figure 1 illustrating a detail of construction of the root end portion of a rotor blade made according to our invention.

Figure 3:
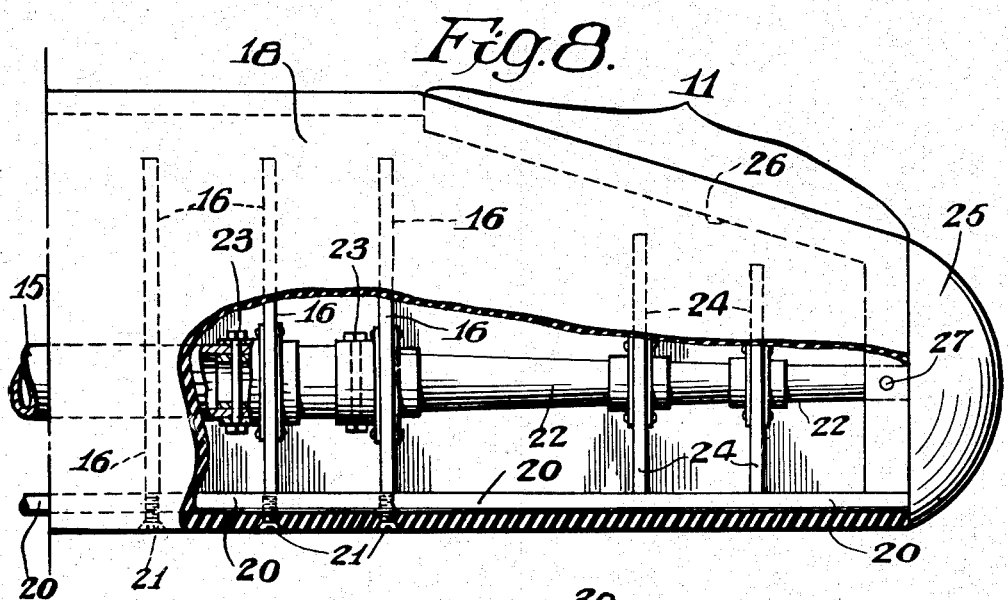
Figure 3 represents a cross-sectional view generally along the line 3—3 of Figure 2.

The rotor blade of the present invention is of a type which has been found particularly well suited for use in helicopters and autogiros.

In one embodiment shown in Figures 1, 2, 3 and 8 we may provide a rotor blade having uniform chord over most of its outboard portion 10, a tapered tip 11 and a non-lifting faired tube inboard portion 12. A fairing block 13 provides a smooth transition from the outboard portion 10 to the inboard portion 12. A retaining collar 14 is formed on, or otherwise attached to the inboard end of the spar 15 for cooperation with a suitable fitting (not shown) on the rotor hub 34.

A central tubular spar 15 forms the structural backbone of the blade and extends throughout most of its length. Within the outboard, working portion 10, the spar 15 is fitted with suitably spaced ribs 16, which are supported on the spar 15 by the flanged collars 17. The ribs 16 are preferably cut from suitably light sheet material such as wood or laminated plastic and are formed to fit accurately within an outermost airfoil envelope 18. The collars 17 may be attached to the ribs 16 by means of rivets 19 or otherwise, and to the spar 15 by spot-welding, shear-pins or otherwise.

The airfoil envelope 18 is of molded seamless form and may be prefabricated from any suitable resilient material such as fabric-reinforced plastic. Its exterior form is molded to the predetermined airfoil contour selected for advantageous performance of the aircraft, or to a form which may readily be deformed to such contour when placed over the rib and tube skeleton. A counterweight rod 20, of suitably heavy material and of weight sufficient to provide the desired operative balance of the blade, is inserted in the envelope 18 adjacent the leading edge and secured in position by means of countersunk head screws 21, or in any other suitable manner. The envelope 18 is slipped into place over the ribs 16 and then securely attached to them by any suitable means such as cement and nails or drive screws; the nails or screws preferably being countersunk so as to eliminate surface irregularities.

One method of finishing the tip, which has been found by us to be advantageous, in practice, is illustrated in Figure 8. An extension piece 22 of smaller diameter is fitted into the end of the tubular spar 15 and held in place by bolts 23, or by other suitable attachment means. The extension 22 is tapered throughout its length and has, attached to it, ribs 24 similar to the main ribs 16 but of size and form modified to suit the desired tip contour. The counterweight rod 20 may be extended into the tip as shown, its end being suitably reduced in dimension.

A tip block 25, preferably of the same material as the ribs, is preferably preformed to the designed aerodynamic contour and is integrally formed, or fitted, with the inwardly extending trailing edge reinforcement 26 of the tapered tip 11. In attaching the tip block 25, the envelope 18 is cut open at the trailing edge and suitably cut back over the length required for the tapering tip. The end of the extension 22 is preferably fitted into a locating recess in the block 25 to which it may be secured by a pin 27, and the envelope skin is then tightly pressed down over the tip skeleton and finally attached thereto by means similar to the bonding of the envelope 18 to the main ribs 16. The open trailing edges are similarly pressed down onto and attached to the trailing edge reinforcement piece 26. The edges of the envelope skin are then smoothed off to form a true trailing edge and a smooth surface joint with the tip block 25.

We have found it preferable to mold the envelope 18 with a thicker wall adjacent the leading edge than adjacent the trailing edge, as shown particularly in Figure 3, in order to withstand the higher pressures and the greater abrasive action encountered near the leading edge. The wall thickness may, however, be uniform, or of any other thickness distribution, if desired, without departing from our invention.

Figure 4:
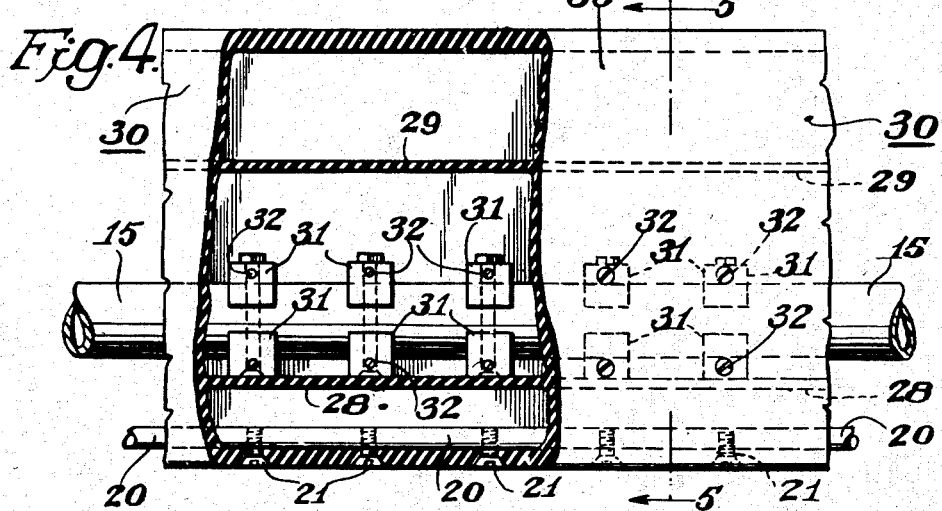
Figure 4 represents a fragmentary elevational view similar to that of Figure 2 but showing a modified form of construction.
Figure 5:
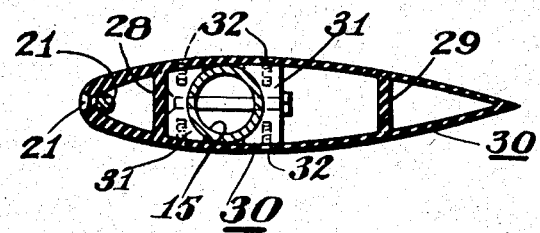
Figure 5 represents a cross-sectional view along the line 5—5 of Figure 4.

In Figures 4 and 5, an alternative embodiment of the present invention is illustrated. In this embodiment, the ribs 16 are omitted and the requisite stiffness is furnished by webs 28 and 29, preferably molded integrally with an outer envelope 30. The attachment of the envelope 30 to the spar 15 may be achieved by means of the bolted-on lugs 31 to which the envelope 30 is detachably secured by drive screws 32, the forward web 28 acting as a location guide in assembly. The counterweight strip 20 is attached as in the embodiment illustrated in Figures 2 and 3. The tip may be formed as hereinabove described, webs 28 and 29 being cut away to permit compression of the skin of the tip portion.

In Figures 6 and 7 there are illustrated alternative forms of prefabricated envelopes, that of Figures 6 having only one web and requiring auxiliary locating means for assembling on the spar, and that of Figure 7 having three webs for greater rigidity if desired.

In Figure 9 there is illustrated a form of fairing for the spar 15 over the inboard, inoperative portion of the blade. The fairing 33, of light, nonstructural material, may be attached to the spar by adhesive tape or otherwise.

While we have shown the various features of our invention in certain specific embodiments, we are aware that our invention may be embodied in other forms without departing from the spirit or essential attributes thereof. Thus, for example, while we have shown our invention as applied to a non-tapering, untwisted blade having its working airfoil applied only to the outboard portion, our invention is equally applicable to blades having full-length working surfaces, or having tapered plan form, or having tapered thickness, or having any desired twist, or having any combination of these characteristics. Furthermore, the specific methods of attachment of the various parts are susceptible of very wide variation, both as to type and dimension, without departing from the scope of our invention. We therefore desire the present embodiments to be considered in all respects as illustrative and not restrictive, reference being had to the appended claims rather than to the foregoing description, to indicate the scope of our invention.

The invention having been hereinabove described, what is hereby claimed as new and desired to be protected by Letters Patent is:

1. In a rotating-wing aircraft having a lifting rotor, a rotor blade comprising a prefabricated form-retaining generally seamless elongated envelope of molded plastic having an external airfoil contour and having an outer longitudinally tapered tip, said tip being reinforced at its trailing edge and terminating in a formed tip-block, the wall of said envelope being thicker at the leading edge than at the trailing edge thereof, a spar having its inner end operatively attached to the hub of said rotor and having its outer end extending within said envelope along the untapered portion thereof, the exposed portion of said spar being faired, a tapered coaxial member extending from said spar and into the tapered tip of said envelope and having its outermost end fastened to said tip-block, and means for attaching said envelope to said spar and to said tapered member at a plurality of spaced points.

2. In a rotating-wing aircraft having a lifting rotor, a rotor blade comprising a prefabricated form-retaining generally seamless elongated envelope of molded plastic or the like having an external airfoil contour and having an outer longitudinally tapered tip, a spar having its inner end operatively attached to the hub of said rotor and having its outer end extending within said envelope along the untapered portion thereof, the exposed portion of said spar being faired, a tapered coaxial member extending from said spar and into the tapered tip of said envelope and having its outermost end fastened to said tip-block, and means for attaching said envelope to said spar and to said tapered member at a plurality of spaced points.

3. In a rotating-wing aircraft having a lifting rotor, a rotor blade comprising a generally seamless form-retaining elongated envelope with external contour of airfoil section, said envelope having a straight leading edge and having its trailing edge swept forward at its outer end, a formed tip-block closing the outer end of said envelope, said tip-block having a portion extending along and reinforcing the swept-forward portion of the trailing edge of said envelope, and an inner supporting spar operatively connecting said envelope to the hub of the rotor.

HAVILAND H. PLATT.
WYNN LAURENCE LE PAGE.